Figure 1:
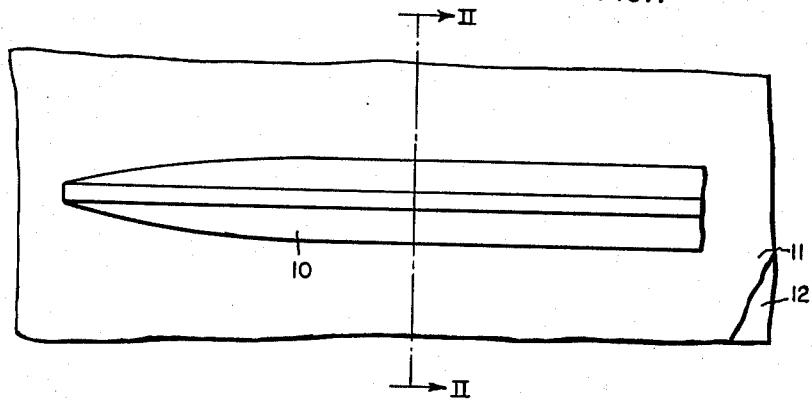

Aug. 17, 1965  D. R. ZAREMSKI  3,201,212

TRIM MEMBER

Filed June 22, 1962

United States Patent Office 3,201,212
Patented Aug. 17, 1965

3,201,212
TRIM MEMBER
Donald R. Zaremski, Cheswick, Pa., assignor to Allegheny Ludlum Steel Corporation, Brackenridge, Pa., a corporation of Pennsylvania
Filed June 22, 1962, Ser. No. 204,332
5 Claims. (Cl. 29—183.5)

This invention relates to improvements in stainless steel trim members, and relates in particular to the protection of stainless steel automotive trim from contact or crevice corrosion.

Stainless steels provide a very excellent material for trim and decorative moldings for automotive uses, and provide outstanding resistance against weather, atmosphere and other types of corrosive elements in road service. Stainless steel also has a bright, lustrous and attractive surface, particularly stainless steel strip material with a No. 2 automotive strip finish which the automobile manufacturers form into trim and further buff and polish to enhance the bright and attractive metallic luster. No other metal used as automotive trim provides such a lasting attractive finish as stainless steel. Years after its application as such a trim it may be cleaned and restored to its original bright and lustrous appearance.

It has been repeatedly observed, however, that the areas of contact between the stainless trim and automotive body panels are subject to sporadic rusting attack. While this does not detract from the appearance of the stainless, it does show appreciable build-up of rust corrosion products at the edge of the molding. The corrosion products which form in this manner originate from corrosive attack of the carbon steel body rather than the stainless steels. There is evidence that the contact of stainless with carbon steel tends to accelerate the attack on the carbon steel because of galvanic potentials. The stainless steels, in their normal corrosion resistant condition, possess a noble or passive potential, while carbon steel has a highly active potential. The difference in potential that exists might be as high as approximately one-half volt. In the absence of contact with stainless steels, the rate of attack on the carbon steel would actually, therefore, be much less. Since it is highly desirable to use stainless steels of this type of application, some means to alleviate this harmful galvanic corrosion was found to be necessary.

The use of coatings or inert materials such as special paints or organic coatings as barrier layers between the stainless steel trim and the painted body serves to retard rust bleeding from the painted mild steel to some extent. However, such coatings are not a satisfactory answer to the rust bleeding problem since corrosion of the body steel eventually penetrates any such barrier in a similar manner to the penetration of the automobile paint. There is no practical barrier material for automotive application that would not contain some pores or pits to initiate corrosion from the automotive body. In forming or fabricating moldings or trim parts, considerable abrasion and scratching damage coatings of this type and thereby render them ineffective.

It has recently been discovered that stainless steel may be given a thin zinc coating prior to its being formed into automotive trim so that the automotive panel contacting surface of the resultant trim has a coating that will corrode sacrificially with respect to the mild steel of the automobile panel, and hence retard or prevent what is commonly known as crevice corrosion. Although this development and discovery has constituted a significant advance in solving the crevice corrosion problem, it is necessary to buff the surface of the automotive trim that is exposed to public view in order to restore the bright and lustrous appearance desired. Such buffing has not been an added operation in the fabrication of stainless steel trim since it has been conventional practice to buff such stainless steel trim prior to the adoption of zinc plating to improve the bright and lustrous surface of the material received in its conventional cold rolled condition. Recent developments in the processing of stainless steels have led to improved surface treatments of stainless steel strip products. Consequently, buffing is no longer an absolute requirement, and it is obviously desirable to minimize or eliminate such an expensive and involved procedure wherever possible.

It has now been found that by the method and article of the present invention a stainless steel automobile trim member may be provided that exhibits a bright and lustrous stainless steel surface but which will not create red rust bleeding from the painted mild steel body panels of automobiles during the normal period of usefulness of the automobile. Simultaneously applicant's method minimizes or eliminates the necessity of buffing during the preparation of stainless steel automotive trim. It has also been found that by the method of the present invention a stainless steel trim member may be provided which exhibits a bright and lustrous stainless steel surface having substantially enhanced resistance to corrosion.

It is, accordingly, the object of the present invention to provide a stainless steel automobile trim that exhibits a bright and lustrous surface that is exposed to view when abutted to a painted mild steel automobile body but which will not cause red rust bleeding of the mild steel body due to galvanic action between the trim member and the mild steel.

It is also an object of the present invention to extend the life of automobile bodies and trim by providing a sacrificial zinc coating to the surface of the stainless steel trim that sacrificially corrodes in regard to the mild steel body of the automobile to avoid red rust bleeding while simultaneously presenting a bright and lustrous exposure surface that exhibits enhanced corrosion resistance.

A still further object of the present invention is to provide a method for enhancing the corrosion resistance of stainless steel automotive trim by providing a sacrificial zinc coating to the surface of the stainless steel that sacrificially corrodes in regard to the mild steel body of the automobile to which it is abutted and prevents red rust bleeding, while simultaneously providing a bright and lustrous surface to that portion of the trim exposed to view without the necessity of buffing a zinc plating from such surface.

Figure 2:
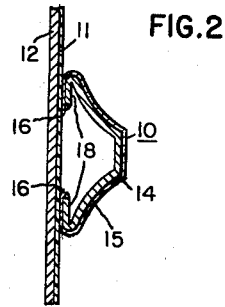

Other objects and advantageous features of the present invention will be obvious from the following description and drawings wherein:

FIGURE 1 is a view in side elevation of an automotive stainless steel trim member mounted on a section of a painted automobile mild steel body, and FIG. 2 is a view in section and greatly enlarged taken along the line II—II of FIG. 1.

In general, the present invention is directed to a stainless steel automotive trim member formed with an automobile mild steel contacting surface that is coated with a thin coating of zinc (of a thickness of from about 5 to $300 \times 10^{-6}$ inches and preferably within the range of from 15 to $100 \times 10^{-6}$ inches), and a bright and lustrous exposed surface having a thin and non-visible chromate coating. The trim member of the present invention does not form a galvanic cell with the mild steel of the automobile panel so as to cause the panel to corrode, and has an exposure surface that not only exhibits the naturally bright and lustrous stainless steel surface, but also contains a non-visible chromate coating that imparts superior corrosion resistance to the prior known stainless steel automobile trim members. The present invention is also directed to the method of manufacturing such stainless steel automobile trim members wherein stainless steel strip is zinc plated or coated (5 to $300 \times 10^{-6}$ inches thickness and preferably 15 to $100 \times 10^{-6}$ inches), then formed into automotive trim having an automobile contacting face and an exposed surface, and removing the appearance of the zinc coating or plate from the exposed surface by contacting said exposed surface with an acidic aqueous solution containing a hexavalent chromium compound.

The use of zinc coatings as sacrificial corrosion coatings on mild steel and non-stainless grades of steel has been practiced for many years. By far the most common process for zinc coating is hot dip galvanizing. There are other methods such as sherardizing, metal spraying and electro deposits. However, since the prior art uses of galvanizing have been for the purpose of effecting selective or sacrificial corrosion of the zinc plate in preference to the metal which is coated, it has been necessary to effect relatively thick coatings of zinc amounting to about .75 to 2.50 oz. per square foot of surface area. The method and article of the present invention are constrasted to the methods and articles of the prior art, not only in that the base metal is a stainless steel member which, under ordinary conditions would not be susceptible to corrosive attack in the manner of mild steel or low alloy steel, but also in the fact that in the present instance a thin zinc plate or coating is applied to a member for sacrificial corrosion with respect to a second member, namely the mild steel automotive body panel. The present coating applied to the automotive panel contact surface of a stainless steel trim member is not a galvanic type coating commonly taught by the prior art in that it does not protect the article to which it is applied, but avoids corrosion from occurring on an article to which that article is attached. The stainless steel is noble in respect to the mild steel body, but the mild steel body panel is noble in respect to the zinc coating on the stainless steel. The thin zinc plating of the present invention retards or eliminates the rust bleeding of the associated mild steel body. Should the zinc coating or plate be applied to the mild steel in the manner commonly taught by the prior art, it would be necessary to effect a coating of a weight of from about .75 to 2.50 grams per square foot in order to properly protect the mild steel body from its corrosive environment.

The zinc coating as applied to the stainless steel strip as in the method of the present invention may be applied in any conventional manner, but should be thin (5 to $300 \times 10^{-6}$ inches, preferably 15 to $100 \times 10^{-6}$ inches) so that it may be converted into a chromate coating that is not visible. Chromate coatings are ordinarily of a thickness wherein they will interfer with the appearance of the article coated. Chromate coatings applied to stainless steel in the manner such as is taught in U.S. Patent 2,991,205, Lincoln et al., provide such a visible coating. It has been found that by the method of the present invention, namely by zinc plating the stainless steel surface with an extremely thin coating having a thickness of less than .0003″ but at least .000005″, it is possible to obtain a continuous chromate coating that is so thin it does not interfere with the naturally bright and lustrous appearance of the stainless steel surface that is exposed to view on an automobile trim member. Particularly satisfactory results have been obtained within the range of .000015″ to .0001″ thick plates.

Chromate coatings are films having a composition considered to be a basic chromium chromate of the formula $Cr_2O_3 \cdot CrO_3$ plus water of hydration. Such films occur when a cleaned metal surface is treated with an acidic aqueous solution of hexavalent chromium compounds usually containing small amounts of inorganic or organic activators. The process consists of the surface metal reacting with the hexavalent chromium in the solution to form a thin, insoluble film on the surface of the metal. Chromium chromate coatings may not ordinarily be applied to stainless steels since such metals possess a substantially corrosion or acid resistant surface that will not react with the aforementioned hexavalent chromium solution. In the method of the present invention, however, this difficulty is overcome by initially applying to the surface of the stainless steel an extremely thin zinc coating which possesses poor corrosion resistance and is highly reactive with nearly any acid solution. Consequently the application of the zinc coating to stainless steel in the method and article of the present invention performs a two-fold function in first providing a sacrificial corrosion resistant coating to the mild steel body contacting the surface of the stainless steel automotive trim while also providing a coating to the exposed surface of the trim that is so thin that it may be subsequently converted into a substantially invisible chromium chromate coating.

Although the conversion of the thin zinc plate on the exposure surface of the automobile trim may be accomplished by dipping, brushing or spraying only the exposure surface with the acid hexavalent chromium solution, it is preferable to remove the appearance of the zinc plate or coating by merely wiping said surface with a sponge or cloth containing the appropriate solution. Another method of converting the thin zinc coating to a substantially invisible but protective coating is to buff the exposure surface with an absorbent cloth buffing wheel that contains some of the aqueous-acid hexavalent chromium solution. In this manner a bright buffed surface may be obtained while simultaneously improving the corrosion resistance of the stainless steel in the manner taught by U.S. Patent 2,991,205, Lincoln et al. As taught by this patent, when chromate coated stainless steel is buffed, the coating is not entirely removed but fills the pits and voids in the stainless steel which may nucleate corrosion when the stainless steel is exposed to a corrosive environment and consequently improves the corrosion resistance of the stainless steel. A light buff will leave a continuous coating while a heavy buff will leave sufficient chromate to improve the corrosion resistance of the stainless steel surface. Other materials such as sulfuric and nitric acids, and caustics such as sodium hydroxide, have been used to remove the zinc coating (not just the appearance of the zinc coating, but the coating itself). Nitric acid is exceedingly slow and ineffective, sulfuric acid effectively removes the coating but in doing so etches the surface and substantially destroys the bright and lustrous finish, and the caustic solutions produce undesirable residual films that interfere with the bright and lustrous surface. In employing the chromate solutions it has been found that they react almost instantaneously to remove the appearance of the zinc, and in doing so lead to the formation of a highly corrosion resistant chromium chromate film that materially enhances the corrosion resistance of the stainless steel trim member in regard to its highly corrosive environment, aside from the crevice corrosion problem.

The chromium chromate bath itself is an aqueous solution that contains at least one hexavalent chromium compound which generally is chromic acid (as $CrO_3$), or a bichromate compound that is acidified to a pH of below 3.5, and often between 1.0 and 2.0. The quantity of chromic acid or bichromate is not critical, but may be present in any amount ranging from trace amounts as low as .05%, by weight, to saturation. The chromate solution need be in contact with the zinc coated stainless steel, usually for a very short time, as briefly as 10 seconds, before it need be wiped off and dried; however, the length of time in which this solution is in contact with the zinc coated stainless steel depends entirely on the exact thickness of the zinc plate within the range of from .000005" to .0003", and the strength and the temperature of the bath being employed (usually ranging from several seconds to 10 minutes). The chromium chromate solution may be employed at temperatures ranging from room temperature up to about 130° F. The chromated member is conventionally rinsed and dried, the rinsing being preferably in water at a temperature not exceeding 160° F.

In the method of the present invention stainless steel strip is zinc coated and then is formed into the automotive trim, and the exposure surface, or that surface that is normally visible when the trim is placed on the automobile, is treated with a chromium chromate solution in such a manner that the surface exposed to view will exhibit the bright and lustrous natural stainless steel surface, whereas the surface of the trim that is abutted to and disposed in seating relation on the mild steel automotive panels will be coated with a thin zinc coating. If the zinc coat or plate is permitted to be too thick, it may not be effectively removed from the surface of the stainless steel while contacting it with the chromium chromate solution. On the other hand, if the zinc coating is too thin (below about .000005", or about .02 gram per square foot), it will not offer a substantially lasting galvanic protection to the mild steel automotive panel, and crevice corrosion will result.

To obtain a substantially continuous zinc coating and yet a coating of a thickness (or thinness) desired, it is preferable to obtain the coating by means of electro deposition. Electro deposition may be accomplished by prior known baths consisting of aqueous solutions containing an electrolyte and zinc. We have employed two different plating baths, both of which are presently used in the metals industry for plating low alloy or carbon steels. Our investigations have indicated that stainless steels may be plated easily by either of these methods, and descriptions of the compositions of both baths employed are given below:

*Table I*

| Cyanide Zinc Plating Solution | | Acid Zinc Plating Solution | |
|---|---|---|---|
| Temperature Range, 20–100° F. | | Temperature range, 130–150° F. pH 3.0–4.0 | |
| Zinc Cyanide, g./l | 60 | Zinc Sulfate, g./l | 360 |
| Sodium Cyanide, g./l | 30 | Sodium Sulfate, g./l | 75 |
| Sodium Hydroxide, g./l | 78 | Magnesium Sulfate, g./l | 60 |
| Powdered Zinc, g./l | 2.4 | | |
| Activated Carbon, g./l | 2.4 | | |

It has been found that the use of reverse current prior to making the stainless parts cathodic for plating is beneficial in obtaining a tighter and more adherent zinc plating on the material. A typical group of operating conditions involving variations in current density and time for both the anodic and cathodic cycles is shown below in Table II, together with a description of the zinc deposit and its adherence to the stainless steel surface for each of these conditions. The zinc deposit weights, expressed in grams per square inch of surface, are shown also for some plating conditions. The plating conditions shown in Table II involve plating 2" x 4" samples (16 square inches) of AISI Type 430 stainless steel strip having a No. 2 (automotive) strip finish:

*Table II*

| Anodic Treatment | | Zinc Plating | | Cyanide Bath | | Acid (sulfate) Bath | |
|---|---|---|---|---|---|---|---|
| Current Density, amps/sq. in. | Time, secs. | Current Density, amps/sq. in. | Time, secs. | Appearance [1] | Coat. Wt., Grams/Sq. Ft. | Appearance [2] | Coat. Wt., Grams/Sq. Ft. |
| .31 | 10 | .031 | 15 | Invisible coating | .0072 | Thin uniform loose coating. | [3] .04464 |
| .31 | 10 | .031 | 30 | ---do--- | .0072 | Med. uniform loose coating. | .04464 |
| .31 | 10 | .031 | 45 | ---do--- | .0072 | ---do--- | .04464 |
| .31 | 10 | .062 | 15 | ---do--- | .0072 | Med. uniform tight coating. | .04464 |
| .31 | 10 | .062 | 30 | ---do--- | .0072 | ---do--- | .04464 |
| .31 | 10 | .062 | 45 | (Lt. coat. near bot. edge) invisible coating. | .0072 | Med. heavy uniform tight coating. | .04464 |
| .31 | 10 | .125 | 15 | Very thin coat., loose | .0072 | Med. uniform tight coatings. | .04464 |
| | | | | All samples below blistered at edge | | | |
| .31 | 10 | .125 | 30 | Thin coating, loose | .0288 | Med. heavy uniform tight coating. | [4] .1584 |
| .31 | 10 | .125 | 45 | ---do--- | .0288 | Heavy uniform tight coating. | .1584 |
| | | | | | | Difference in coating at edge on all samples below | |
| .31 | 10 | .188 | 15 | ---do--- | .0288 | Heavy coating, tight | .1584 |
| .31 | 10 | .188 | 30 | ---do--- | [5] .06336 | ---do--- | .1584 |
| .31 | 10 | .188 | 45 | Med. coating, loose | .06336 | ---do--- | .1584 |
| .31 | 10 | .25 | 15 | ---do--- | .06336 | ---do--- | .1584 |
| .31 | 10 | .25 | 30 | ---do--- | .06336 | ---do--- | .1584 |
| .31 | 10 | .25 | 45 | ---do--- | .06336 | ---do--- | .1584 |

[1] Although the cyanide baths provided zinc plates or coatings described generally as being loose, such coatings proved to be adequately tenacious to withstand drawing into automotive trim and adequately protected mild steel automotive panels to which the trim was attached. The coatings described as invisible did not noticeably protect automotive panels or afford corrosion protection to the plated and buffed stainless steel surface.
[2] The acid baths provided superior and more tenacious plates than the cyanide baths.
[3] Approximately .0000026" thick.
[4] Approximately .000010" thick.
[5] Approximately .0000035" thick.

While the tightness or degree of adherence of the zinc coat or electroplate to the surface of the stainless steel is not critical insofar as its sacrificial corrosion function is concerned, such coatings or plates must be sufficiently tenacious to withstand handling and forming operations. Accordingly, it has been found to be desirable to clean and activate the surface of the stainless steel prior to electroplating by first subjecting the strip to a hot alkaline cleaner and then immersing the strip in hot sulfuric acid in a manner such as or similar to that set forth by the American Society for Testing and Materials (ASTM Standards, 1961, ASTM Designation: B 254-53, Part 2, "Recommended Practice for Preparation of and Electroplating on Stainless Steel," commencing on page 1136). Stainless steel strip which has just been pickled or bright annealed does not require alkaline cleaning prior to activation. The stainless steel should be removed from the sulfuric acid bath immediately upon detection of hydrogen evolution rather than allowing it to remain in the solution for a minimum of one minute after such evolution commences, as taught in the afore-mentioned ASTM specifications. This results in a tight, adhering coating of zinc over the surface of the stainless steel without detracting from the bright anneal surface finish thereof. If the stainless steel is not removed from the activating acid bath promptly, its bright and lustrous surface becomes dull and thus, even though the zinc coating is tightly adherent thereto, the resulting coated steel is not suitable from the appearance viewpoint for automobile trim applications.

FIGS. 1 and 2 of the accompanying drawing show a typical stainless steel trim member 10 that has been manufactured in accordance with the method of the present invention and which is mounted as by means of clips (not shown) on the painted surface 11 of an automobile panel 12 of carbon steel. The surface 14 of the trim member 10 (FIG. 2) which is exposed to view on the automobile and thus constitutes an exposure surface exhibits a chromium chromate coating 15 which is not visible, and hence the visible appearance is that of the surface 14 which is a bright and lustrous attractive stainless steel finish. The zinc plate remaining (after conversion to a chromate coating in accordance with the present method) is shown at 16 on the automobile panel contacting flanges or surfaces 18 of the trim member 10. Normal corrosion or crevice corrosion would occur in the contact area between the flanges 18 and the painted panel 12; however, in accordance with the present invention, the sacrificial layer of zinc 16 prevents corrosion within the contact area, and that which does occur will not be the offensive red rust bleeding usually experienced but will be a slightly milky white type of corrosion product which is easily and effectively removed by any of the conventional automobile cleaning methods. For the purposes of the present specification and claims, flanges 18 constitute the automotive contact "face" of the trim member 10.

It has been established, as a result of the various tests conducted with AISI Type 430, 201 and 301 stainless steels, that very tight zinc deposits may be formed which can be satisfactorily retained on the surface of the stainless steel during mild fabrication operations such as the forming of automotive trim. While it is possible that during such forming operation bits of the zinc deposit might be scratched off the automobile contacting face of the trim during fabrication, a protective sacrificial corrosion effect still exists because of the sacrificial nature of the zinc plating. This is a distinct advantage as contrasted to the inert coatings heretofore mentioned. To illustrate the advantage of the application of extremely thin zinc plates in protecting against accelerated galvanic corrosion of carbon steel panels abutted to stainless steel, a number of experiments were conducted. In one instance, zinc coated stainless steel specimens were placed in close contact with a painted but scratched mild steel panel. The scratches were placed on this panel artificially to insure exposure of bare carbon steel. This assembly was then immersed in a corrosive solution frequently used in accelerated laboratory evaluation of automotive trim known as the slag-salt mixture. The slag-salt mixture consists of .5 gram of sodium sulfate, .25 gram of sodium sulfite, .1 gram of sodium thiosulfate, 52.5 grams of sodium chloride and 52.5 grams of calcium chloride dissolved in 1050 ml. of distilled water. The pH must be between about 8 and 9.5. Test samples were immersed in the solution for one second at room temperature, then removed and dried for 100 seconds before a 250-watt heat lamp placed six inches away. The dried samples were then re-immersed and this test cycle continued. After two weeks' exposure under these conditions, no rust had developed at the scratches on the carbon steel panel. In contrast, a similar assembly of unplated stainless steel abutted to painted but scratched mild steel was tested under the same conditions with a resulting heavy rust bleeding in eight hours.

Exterior exposure in the atmosphere of similarly constructed stainless steel on mild steel structures which were intermittently sprayed with the same solution again showed the same advantages for the zinc plated assemblies over the unplated assemblies in one week's exposure time.

The explanation of this protective effect is the fact that zinc is sacrificially being corroded, and at the same time the carbon steel attack is actually being lessened under these circumstances.

To further illustrate the method and article of the present invention, the following chromium chromate solution was prepared:

*Table III*

| Constituent | Symbol | Concentration | |
|---|---|---|---|
| | | Oz./gal. | Gl. oz./gal. |
| Water | $H_2O$ | 8 | 8 |
| Sulfuric acid (sp. gr. 1.84) | $H_2SO_4$ | 6 | 3.26 |
| Nitric acid (sp. gr. 1.41) | $HNO_3$ | 32 | 22.6 |
| Acetic acid (glacial) | $CH_3COOH$ | 16 | 12.6 |
| Chromic acid | $CrO_3$ | 32 | |
| Sodium Dichromate | $Na_2Cr_2O_7$ | 32 | |

Dilution, 7 parts water to 1 part solution concentrate.
Temperature, room temperature.

The use of the above solution in its diluted form, together with simple wiping, was found to provide for the complete and instantaneous removal of all zinc electro deposits of thicknesses of less than .00001". Heavier deposits, too, were successfully removed, but only by employing prolonged and repeated wipings. Of course, the zinc plates were not actually wiped from the surface but were converted to chromate coats which were not visible. The solution in no way detrimentally affected the underlying metal, nor did it lead to the formation of an unattractive residue or film.

Aside from providing selective and complete removal of zinc electro deposits, use of the conversion coating solution was also found to impart added corrosion resistance to the underlying stainless steel. In this respect, the over-all method of removal, or apparent removal, is unique.

The manner in which improved corrosion resistance was obtained through the use of the conversion coating solution is illustrated in Table IV below. As is indicated, four different accelerated corrosion tests, all of which have been prescribed by the automotive industry, were used for the evaluation. In each test it is seen that in the untreated condition, i.e., mill produced, AISI Types 201, 430 and 434 (exhibiting a No. 2 automotive strip finish) were found to undergo various degrees of attack. After zinc plating (to between .000005" and .0001" by the acid baths of Table I and the methods of Table II) and subsequent treatment by wiping with the conversion coating solution, each of the alloy grades was found to exhibit much improved corrosion resistance, and, in some cases, to exhibit total immunity to attack.

Table IV

| Treatment | Type 201 | | Type 430 | | Type 434 | |
|---|---|---|---|---|---|---|
| | Before | After | Before | After | Before | After |
| Salt Spray[1] | 1 | 0 | 1 | 0 | 1 | 0 |
| Salt Slag[2] | 50 | 0 | 100 | 5 | 5 | 0 |
| Ferric Chloride[3] | 75 | 0 | 200 | 100 | 100 | 10 |
| Corrodkote[4] | | | 20 | 1 | 1.5 | 0 |

[1] Panels of stainless steel (2″ x 4″ x 20 to 30 gage) with cleaned surfaces are set upright in a salt spray cabinet and subjected to a 20%, by weight, NaCl in distilled water fog or spray for 100 hrs. at room temperature.

[2] Panels of stainless steel are immersed in a salt slag solution (.5 gm. Na$_2$SO$_4$, .25 gm. of Na$_2$SO$_3$, .1 gm. of Na$_2$S$_2$O$_3$, 52.5 grms. of CaCl$_2$, 52.5 gms. of NaCl dissolved in 1,050 ml. of distilled water pH 8–9.5) for one second at room temperature, removed, dried for 100 seconds before a 250-watt heat lamp placed 6″ away and re-immersed. This cycle is continued for a period of eight hours.

[3] Samples are immersed in an aqueous 5% by weight, ferric chloride solution for 15 minutes at room temperature.

[4] A paste (0.99 gm. FeCl$_3$·6H$_2$O, 0.21 gm. Cu(NO$_3$)$_2$·3H$_2$O, 6.00 gms. NH$_4$Cl, 180 gms. Kaolin and 300 ml. of distilled water) is sprayed or brushed onto the surface of cleaned and degreased stainless steel panels to form a coat approximately .002″ thick. The coat is allowed to dry and the panels are placed in a humidity cabinet at 98–100° F. and 99–100% relative humidity for 3 hours. The panels are inspected both before and after rinsing away the Corodkote for rust spots.

Aside from the above tests, additional evaluations were made to determine the effects of the conversion coating solution on crevice-contact corrosion resistance. In these tests several simulated trim sections of Type 434 were zinc plated, their exposure surfaces were wiped with the conversion coating solution of Table III and then tested while in contact with painted mild steel panels (their automobile contacting face abutting the panel) using the salt-slag test solution described above. Control samples consisting of identical assemblies that had not been zinc plated or chromate conversion coated were tested and found to undergo attack in creviced areas (between the flanges 18 and panel 11, FIGS. 1 and 2) within the first four hours of testing. The specially prepared samples, on the other hand, showed no attack after an exposure time of sixteen hours, at which time the test was stopped. Hence from this data it is seen that crevice corrosion resistance is improved with the use of the conversion coating solution. In the event the solution is improperly employed, resulting in the accidental removal of zinc deposits within creviced areas, some degree of protection would still be provided, and the corrosion tests conclusively prove that the presence of the sacrificial zinc coatings provides a very superior crevice corrosion resistant trim member and that the non-visible chromate coat on the exposure surface of the stainless steel trim enhances the corrosion resistance of the stainless steel surface.

Type 430 stainless steel strip was zinc plated with an acid zincc plating bath, as revealed in Table I by the method set forth in Table II, to obtain a zinc coating of approximately .000015″ thickness, or approximately .20 gram per square foot. The zinc coated stainless steel was then formed into automotive trim such as is revealed in FIGS. 1 and 2 of the present invention so that the zinc plate covered the outside surfaces, including the automotive panel contacting surface. A solution such as is revealed in Table III was employed on a sponge to "wipe off" the appearance of the zinc plate on the exposure surface of the automotive trim. The zinc plate was not wiped off, but was converted into an extremely thin non-visible chromate coating. The exposure surface was then rinsed with water and dried, whereupon it exhibited its naturally bright and lustrous appearance (except for its automobile contacting face). Such automotive trim members were attached to automobiles in the manner shown by the accompanying drawings and were placed in test service in a corrosive area within the United States. Such tests have shown that the article of the present invention produced by the method of the present invention has exhibited far superior crevice corrosion resistance and resistance to corrosion in general when compared to untreated automotive trim.

The method and articles of the present invention are particularly significant when applied to those stainless steel grades ordinarily employed in the manufacture of automotive trim parts. For example, these materials are commonly fabricated from AISI Type 430 stainless steel or modifications of this grade such as the Type 434 material which consists of AISI Type 430 plus small additions of Mo (about 1.00%). The invention is equally significant when employed in conjunction with AISI Types 301 and 201 stainless steels which are also commonly used for such applications. It is, of course, understood that the method and article of the present invention are equally applicable to any of the stainless steel grades which may be employed as trim material abutting against a mild steel panel. In the embodiment of the invention, the corrosion resistance properties of the surface of the stainless steel are significantly enhanced by being first zinc coated and then buffed, and apply to all stainless steel grades regardless of their specific application. For instance, the method and article of the present invention encompass all stainless steel grades which contain from about 10 to 30% Cr plus either residual Ni as exists in the nominally ferritic and martensitic grades to the grades containing small nickel contents as in some of the hardenable grades of the non-austenitic stainless steels and including austenitic grades containing up to 30% nickel. The invention encompasses such stainless steel grades containing from 10% to 30% chromium, although they may contain residual or small purposeful additions of such materials as Mo, V, Ti, Cb, W, B, N and Se.

For the purpose of the present specification and claims, the term "automobile panel" shall include all parts of an automobile body to which bright and lustrous trim members may be attached such as automobile doors, fenders, bodies, etc. Also, the terms "mild steel" and "carbon steel" shall include the non-stainless grades of steel which readily corrode, including all steels containing less than about 5% of chromium, molybdenum or nickel, such terms being particularly drawn to those grades employed in the manufacture of automobile panels such as AISI Type 1010, 1020, etc.

I claim:

1. A stainless steel trim member for attachment to a member formed of a steel that is less noble than stainless steel comprising a formed stainless steel article having a contact face disposed to abut said less noble steel member and an exposure surface disposed to exhibit a stainless steel surface, a zinc coating disposed over said contact face and a thin, substantially invisible in situ chemical reaction chromate conversion coating disposed over said exposure surface and in direct contact therewith, whereby when the trim member is attached to the less noble steel, galvanic corrosion of the less noble steel will be prevented and the exposure surface of the stainless steel will have increased corrosion resistance.

2. A stainless steel trim member for attachment to a member formed of a steel that is less noble than stainless steel comprising a formed stainless steel article having a contact face disposed to abut said less noble steel member and an exposure surface disposed to exhibit a stainless steel surface, said contact face having a zinc coating thereon that is from about .000005 to .0003″ thick and a thin, substantially invisible in situ chemical reaction chromate conversion coating disposed over said exposure surface and in direct contact therewith, whereby when the trim member is attached to the less noble steel, galvanic corrosion of the less noble steel will be prevented and the exposure surface of the stainless steel will have increased corrosion resistance.

3. A stainless steel trim member for attachment to a member formed of a steel that is less noble than stainless steel comprising a formed stainless steel article having a contact face disposed to abut said less noble steel member and an exposure surface disposed to exhibit a stainless steel surface, said contact face having a zinc coating thereon that is from about .000015 to .0001" thick and a thin, substantially invisible in situ chemical reaction chromate conversion coating disposed over said exposure surface and in direct contact therewith, whereby when the trim member is attached to the less noble steel, galvanic corrosion of the less noble steel will be prevented and the exposure surface of the stainless steel will have increased corrosion resistance.

4. A stainless steel trim member for attachment to a painted mild steel panel comprising a formed stainless steel article having a contact face disposed to abut said panel and an exposure surface disposed to exhibit a bright and lustrous stainless steel surface, said contact face being coated with zinc, said coating being from about .000005 to .0003" thick, and said bright and lustrous stainless steel surface of said exposure surface having a thin, substantially invisible in situ chemical reaction chromate conversion coating disposed thereover and in direct contact therewith, whereby when the trim member is attached to the less noble steel, galvanic corrosion of the less noble steel will be prevented and the exposure surface of the stainless steel will have increased corrosion resistance.

5. A stainless steel trim member for attachment to a painted mild steel panel comprising a formed stainless steel article having a contact face disposed to abut said panel and an exposure surface disposed to exhibit a bright and lustrous stainless steel surface, said contact face being coated with zinc, said coating being from about .000015 to .0001" thick, and said bright and lustrous stainless steel surface of said exposure surface having a thin, substantially invisible in situ chemical reaction chromate conversion coating disposed thereover and in direct contact therewith, whereby when the trim member is attached to the less noble steel, galvanic corrosion of the less noble steel will be prevented and the exposure surface of the stainless steel will have increased corrosion resistance.

References Cited by the Examiner
UNITED STATES PATENTS

| | | | |
|---|---|---|---|
| 1,268,987 | 6/18 | McMullen | 29—196.5 X |
| 1,972,835 | 9/34 | Tainton | 204—55 X |
| 2,547,947 | 3/51 | Kleis | 29—196.5 X |
| 2,636,257 | 4/53 | Ford | 29—195 |
| 2,684,522 | 7/54 | Khouri | 29—195 |
| 2,887,418 | 5/59 | Whitby | 148—6.2 |
| 2,964,432 | 12/60 | Francis | 148—6.2 |
| 2,991,205 | 7/61 | Lincoln | 148—6.2 |
| 3,090,118 | 5/63 | Hanzel | 29—199 X |
| 3,112,231 | 11/63 | Schuster | 148—6.2 |

DAVID L. RECK, *Primary Examiner.*

HYLAND BIZOT, *Examiner.*